United States Patent
Matsui et al.

(10) Patent No.: US 6,425,082 B1
(45) Date of Patent: Jul. 23, 2002

(54) WATERMARK APPLIED TO ONE-DIMENSIONAL DATA

(75) Inventors: Kineo Matsui; Munetoshi Iwakiri, both of Yokosuka (JP)

(73) Assignee: Kowa Co., Ltd., Nagoya (JP)

( * ) Notice: Subject to any disclaimer, the term of this patent is extended or adjusted under 35 U.S.C. 154(b) by 82 days.

(21) Appl. No.: 09/619,022

(22) Filed: Jul. 19, 2000

Related U.S. Application Data

(63) Continuation of application No. PCT/JP98/01519, filed on Apr. 1, 1998.

(30) Foreign Application Priority Data

Jan. 27, 1998 (JP) .......................................... 10-030492

(51) Int. Cl.[7] ................................................ G06K 9/36
(52) U.S. Cl. ...................... 713/176; 382/250; 382/283; 380/207; 380/208; 380/237; 380/238
(58) Field of Search .............................. 380/207, 208, 380/237, 238; 713/176; 382/250, 283, 306

(56) References Cited

U.S. PATENT DOCUMENTS

| | | | | |
|---|---|---|---|---|
| 5,809,139 A | * | 9/1998 | Girod et al. | 380/5 |
| 6,037,984 A | * | 3/2000 | Isnardi et al. | 348/403 |
| 6,061,793 A | * | 5/2000 | Tewfik et al. | 713/176 |
| 6,226,387 B1 | * | 5/2000 | Tewfik et al. | 382/100 |
| 6,192,139 B1 | * | 2/2001 | Tao | 382/100 |
| 6,208,745 B1 | * | 3/2001 | Florencio et al. | 382/100 |

* cited by examiner

*Primary Examiner*—Gilberto Barrón
*Assistant Examiner*—Paul E. Callahan
(74) *Attorney, Agent, or Firm*—Beyer Weaver & Thomas LLP

(57) ABSTRACT

In the process of embedding watermark information in one-dimensional source data, first spread one-dimensional data x(t) is generated by subjecting one-dimensional source data s(t) to spectrum-spreading operation using a PN sequence g(t). This first spread one-dimensional data x(t) then undergoes a modified discrete cosine transformation. A specific frequency component value of the MDCT coefficients is modulated to provide association with the watermark information. The modulated frequency component then undergoes inverse transformation to generate second spread one-dimensional data x'(t). Then, using the same PN sequence in the spreading, the second spread one-dimensional data is subjected to spectrum-despreading to produce digitally watermarked one-dimensional data in which watermark data has been embedded.

16 Claims, 12 Drawing Sheets audio signal s(t)

PN sequence  +1 g(t)

−1

$x(t) = s(t) \cdot g(t)$ $x(t) \cdot g(t) = s(t)$ $(g^2(t) = 1)$

Watermark information extraction process

Fig. 15 (a) without embedded watermark information
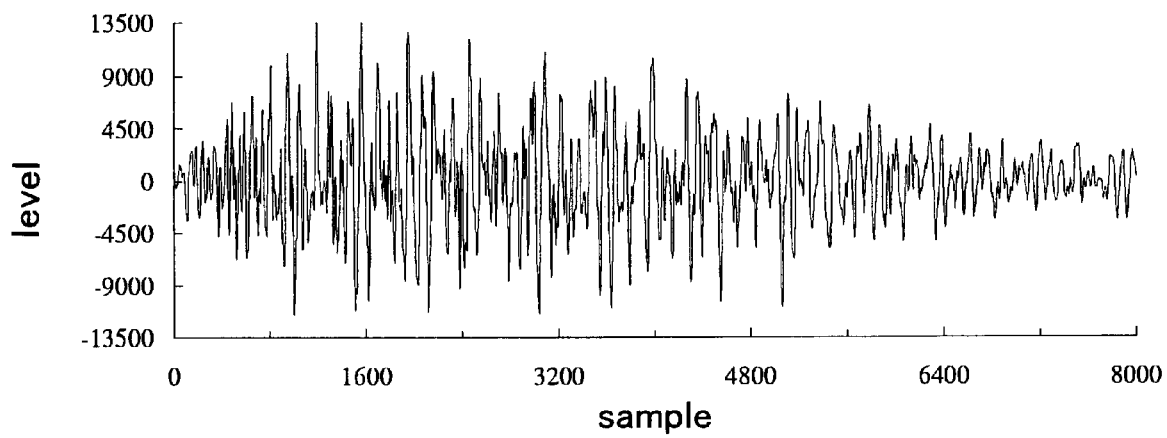
Fig. 15 (b) with embedded watermark information
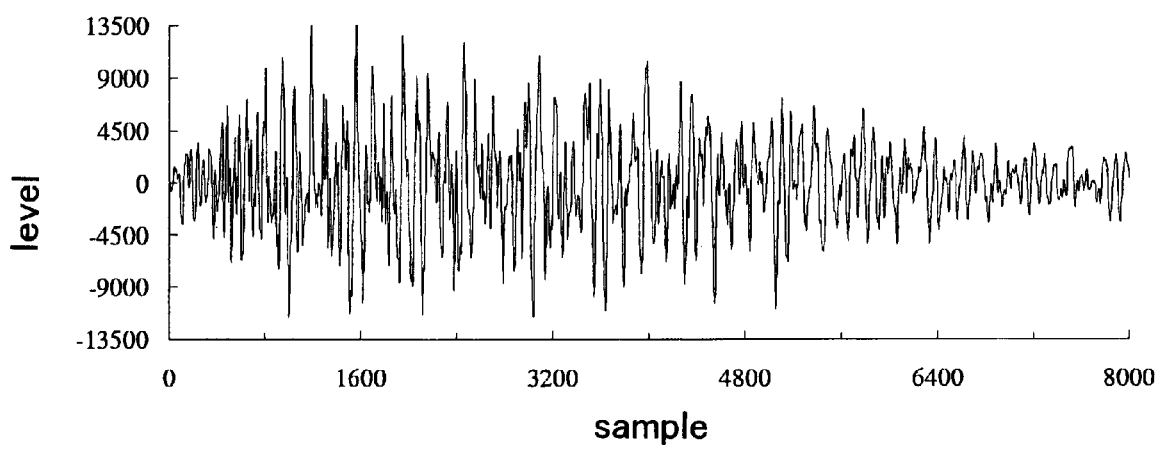
Fig. 15 (c) differential
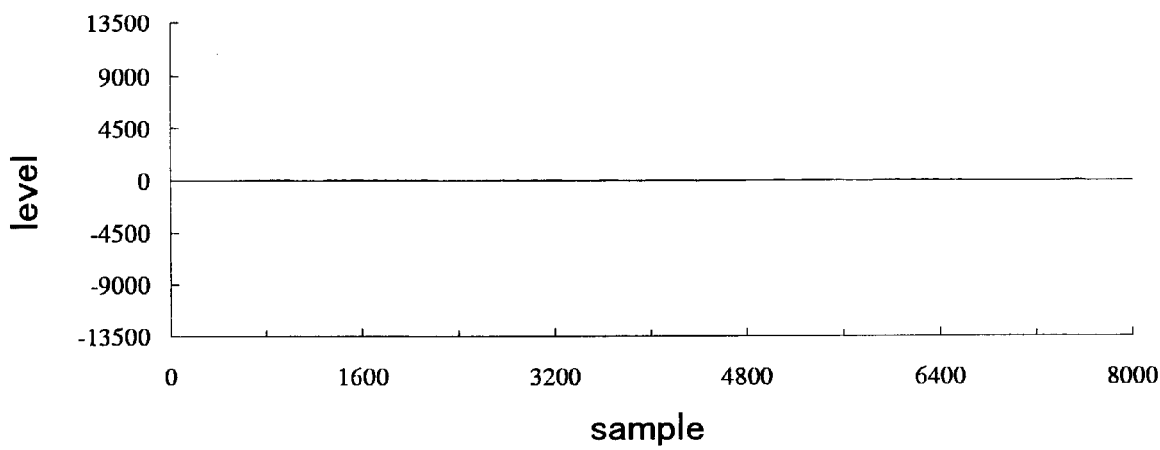

WATERMARK APPLIED TO ONE-DIMENSIONAL DATA

This application is a Continuation application of copending prior International Application PCT/JP98/01519 filed on Apr. 1, 1998 which designated the United States, the disclosure of which is incorporated by reference.

TECHNICAL FIELD

The present invention relates to a watermark, and more particularly relates to a technique for embedding watermark information in one-dimensional data such as audio data, and to a technique for extracting watermark information from one-dimensional data in which such a watermark has been embedded.

BACKGROUND ART

Pulse code modulation (PCM) is widely used to produce digital audio data. In PCM, an analog audio signal is sampled, quantized, and subjected to linear pulse encoding to produce digital audio data. Music software typically uses PCM involving quantization on 16 bits with a 44.1 kHz sampling rate for digitization. This method can faithfully reproduce sound in the human audible frequency band, so audio can be digitized while maintaining extremely high sound quality.

However, a characteristic of digital audio data is that it can easily be reproduced completely (i.e., can be faithfully reproduced). While the ability to faithfully reproduce audio data is a significant advantage of digitization, it also makes the issue of copyright protection more crucial. In recent years, the so-called "digital watermark" has been adopted as a countermeasure. Digital watermarking is a technique for embedding watermark information, such as copyright information, in audio data in a form that cannot be detected by the human senses.

However, conventional digital watermark technology has the drawback of significant noise resulting from embedding of watermark information, which, in the case of music software, for example, can significantly degrade sound quality, and is therefore unsuitable where high data quality is required. Another problem is that watermark information is not secure, so that watermark information can be extracted relatively easily by a third party. This problem is not limited to digital watermarking of audio data, but also pertains to digital watermarking of various other types of one-dimensional data such as measurement data, digital control feedback signals, and the like.

The present invention was developed in order to overcome the drawbacks of the prior art, and has as an object to provide a technique affording reduced noise resulting from embedding of watermark information, as well as secure watermark information.

SUMMARY OF THE INVENTION

In order to achieve the stated objects at least in part, according to the present invention, in the process of embedding watermark information in one-dimensional source data, first, a spectrum-spreading operation involving an operation equivalent to multiplying the one-dimensional source data by a specific positive/negative value sequence that randomly assumes positive/negative values having a specific absolute value is performed to generate first spread one-dimensional data. This first spread one-dimensional data then undergoes an orthogonal transformation. A specific frequency component value of the transform coefficients obtained through orthogonal transformation is modulated to provide association with the watermark information. The modulated frequency component then undergoes inverse orthogonal transformation to generate second spread one-dimensional data. Then, using the specific positive/negative value sequence mentioned earlier, the second spread one-dimensional data is subjected to spectrum-despreading to produce digitally watermarked one-dimensional data in which watermark data has been embedded.

According to the invention described hereinabove, prior to embedding watermark information, the one-dimensional source data is subjected to spectrum-spreading with a specific positive/negative value sequence, and it is thus extremely difficult to extract the watermark information from the watermarked one-dimensional data without knowing the specific positive/negative value sequence. Accordingly, watermark information can be made more secure by means of spectrum-spreading. Further, according to the present invention, a specific frequency component value of orthogonal transform coefficients is modulated to provided association with the watermark information, thus reducing noise caused by watermark information in one-dimensional data having undergone inverse orthogonal transformation.

In preferred practice, the specific positive/negative value sequence will be generated according to a specific frequency generation key.

This obviates the need to store all specific positive/negative value sequences, since identical spectrum-spreading/despreading processes can be carried out simply by storing the frequency generation key.

The aforementioned orthogonal transformation is a modified discrete cosine transformation wherein each of a number of frames each consisting of 2M (where M is an integer equal to 2 or greater) data from the first spread one-dimensional data undergoes a transformation using a predetermined window function; the first spread one-dimensional data may be divided into a plurality of frames in the modified discrete cosine transformation such that adjacent frames take locations mutually shifted by intervals of M data.

By using this kind of modified discrete cosine transformation, frame distortion can be minimized and noise further reduced.

In preferred practice, the specific frequency component associated with the watermark information will be a frequency component value substantially equivalent to M/2.

In this way, noise can be further reduced.

Embedding of watermark information in a specific frequency component can be accomplished by quantizing a specific frequency component by a predetermined integer kd to generate a first quantized value, associating the least significant bit of the first quantized value with the watermark information bit value through modulation to generate a second quantized value, and multiplying the second quantized value by the predetermined integer kd to generate a modulated frequency component.

Increasing the size of integer kd has the advantage of increasing the likelihood of correct extraction of the watermark information even if a certain level of bit errors should occur in the watermarked one-dimensional data.

According to the present invention, in the process of extracting watermark information form watermarked one-dimensional data in which watermark information has been embedded, first, spectrum-spreading is performed by an operation equivalent to multiplying the watermarked one-dimensional data by a specific positive/negative value sequence that randomly assumes positive/negative values having a specific absolute value, thereby generating first spread watermarked one-dimensional data. This first spread watermarked one-dimensional data then undergoes an orthogonal transformation. Watermark information associated with a specific frequency component value is then extracted from the specific frequency component value of the transform coefficients obtained from the orthogonal transform.

In this way, watermark information embedded by means of the embedding process described above can be extracted from watermarked one-dimensional data.

The several embodiments of the invention are listed below.

(a) A method for embedding watermark information in one-dimensional data.

(b) An apparatus for embedding watermark information in one-dimensional data.

(c) A storage medium for storing a computer program for embedding watermark information in one-dimensional data.

(d) A storage medium for storing digitally watermarked one-dimensional data containing embedded watermark information.

(e) A method for extracting watermark information from digitally watermarked one-dimensional data.

(i) An apparatus for extracting watermark information from digitally watermarked one-dimensional data.

(g) A storage medium for storing a computer program for extracting watermark information from digitally watermarked one-dimensional data.

BRIEF DESCRIPTION OF THE DRAWINGS

FIGS. 15(a)–15(c) are reproduced audio waveforms devoid of embedded watermark information, a reproduced audio waveform containing embedded watermark information, and the differential waveform thereof.

BEST MODE FOR CARRYING OUT THE INVENTION

A Overall Design of the Device

Figure 1:
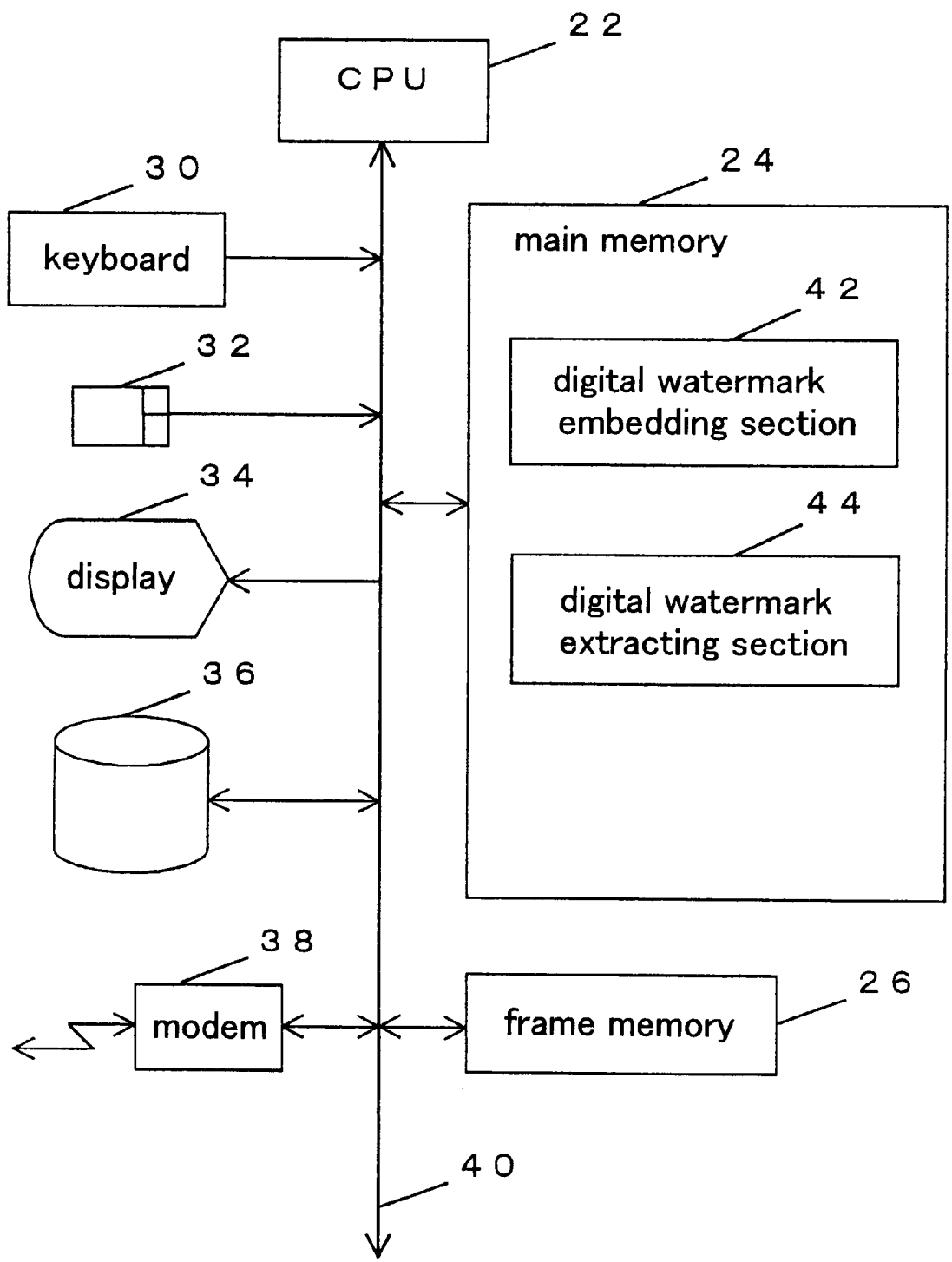
FIG. 1 is a block diagram showing the design of the digital watermarking device pertaining to a first embodiment.

The embodiments of invention are described hereinbelow. FIG. 1 is a block diagram showing the design of the digital watermarking device pertaining to a first embodiment. The digital watermarking device is a computer comprising a CPU 22, a main memory 24 including ROM and RAM, a frame memory 26, a keyboard 30, a mouse 32, a display unit 34, a hard disk 36, a modem 38, and a bus 40 connecting these elements. The interface circuitry is not shown in FIG. 1. Modem 38 is connected, to a computer network via a communications line, not shown in the drawing. A server (not shown) in the computer network functions as a program providing device for providing computer programs to an image processing device over the communications line.

Main memory 24 stores computer programs for executing the functions of a digital watermark embedding section 42 and a digital watermark extracting section 44. The functions of sections 42 and 44 are described below.

Computer programs for executing the functions of sections 42 and 44 are provided stored on a computer-readable storage medium such as a flexible disk (floppy disk) or CD-ROM. Computer programs are read from the storage medium and transferred to an internal memory device or external memory device. Alternatively, computer programs may be provided to the computer over a communications line. When a computer program's functions are to be executed, the computer program stored in an internal memory device is executed by the computer's microprocessor. Alternatively, a computer program stored in a storage medium may be read and executed directly by the computer.

As used herein, the term "computer" includes hardware and the operating system, and refers to hardware operated under the control of the operating system. Where an application program is capable of operating hardware without the aid of an operating system, the hardware per se is equivalent to the computer. Hardware is provided at a minimum with a microprocessor (a CPU, etc.) and means for reading computer programs stored in a storage medium. Computer programs include program code for executing the functions of the various means mentioned earlier by the computer. Some of the above functions may be performed by the operating system rather than application programs.

As used herein, "storage medium" refers to flexible disks, CD-ROM, magnetooptical disks, IC cards, ROM cartridges, punch cards, printed material imprinted with symbols (such as bar codes), internal computer storage devices (e.g., RAM or ROM memory), external storage devices, and various other media readable by the computer.

B. Digital Watermark Embedding Process

Figure 2:
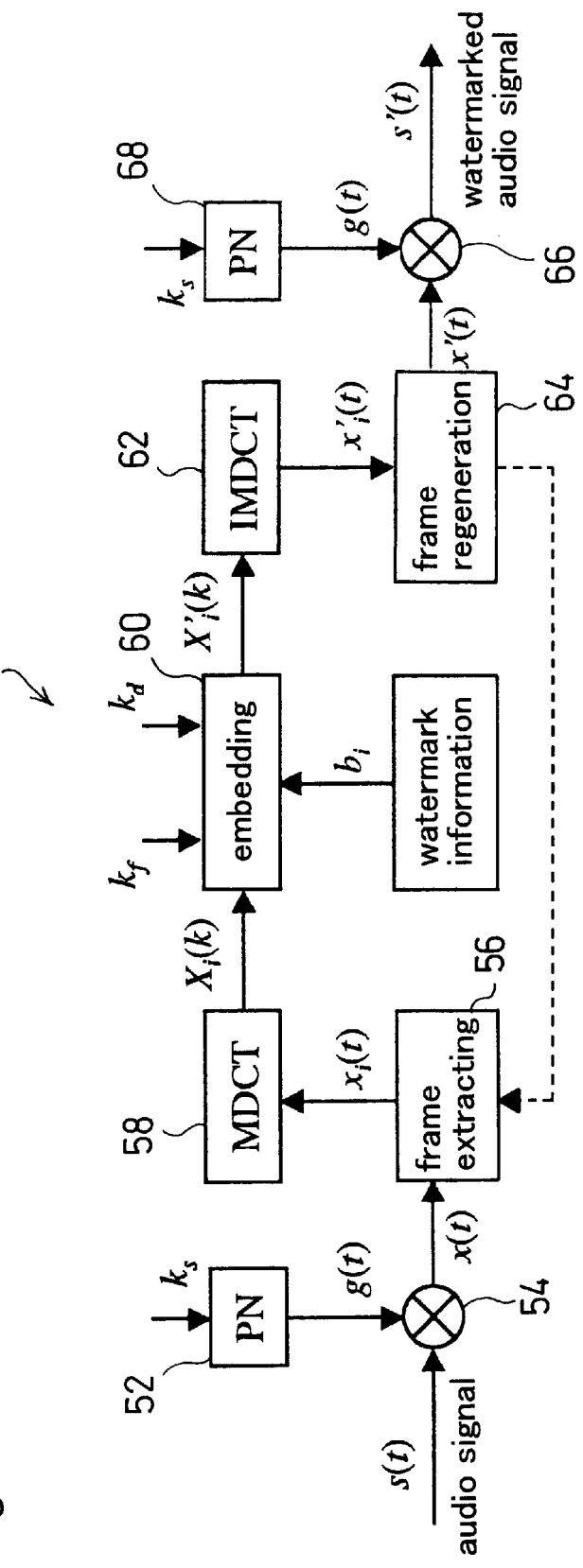
FIG. 2 is a block diagram showing the function of a digital watermark embedding section 42.

FIG. 2 is a block diagram showing the function of a digital watermark embedding section 42. Digital watermark embedding section 42 comprises a first PN sequence generator 52, a first multiplier 54, a frame extractor 56, an MDCT (modified discrete cosine transformation) processor 58, an embedding processor 60, an IMDCT (inverse modified discrete cosine transformation) processor 62, a frame regenerator 64, a second multiplier 66, and a second PN sequence generator 68.

First PN sequence generator 52 and first multiplier 54 are together the equivalent of a spectrum-spreading section for performing spectrum-spreading. Frame extractor 56 and MDCT processor 58 are together the equivalent of an orthogonal transformation section for performing orthogonal transformations. IMDCT processor 62 and frame regenerator 64 are together the equivalent of an inverse transformation section for performing inverse transformations. Second multiplier 66 and second PN sequence generator 68 are together the equivalent of a spectrum-despreading section for performing spectrum-despreading.

PN sequence generators 52, 68 generate binary PN sequences (positive/negative sequences) g(t) that randomly assume the values +1 and −1. The random pattern of a PN sequence g(t) is determined in accordance with a PN sequence generating key ks (ks is an integer) input to PN sequence generators 52, 68. Specifically, for the same given PN sequence generating key ks, the two PN sequence generators 52, 68 will generate PN sequences g(t) having the same pattern. PN sequence generators 52, 68 may utilize, for example, the standard pseudo-random number generating function in the C language, in which case the PN sequence generating key ks is input into the function as a seed for random number generation. Where the least significant bit of a randomly generated number is a "1" the bit value "1" thereof is output as PN sequence g(t); where the least significant bit is a "0" a "−1" is output as PN sequence g(t). In this way, a binary PN sequence g(t) of random +1's and −1's can be generated.

The reason for using a PN sequence generating key ks is as follows. PN sequences used for spectrum-spreading are typically large. Since the same given PN sequence is required for extracting watermark information, it is necessary to completely retain (store) the entire PN sequence. In the present embodiment, using a pseudo-random number generator (for example, the pseudo-random number generating function that is a standard function in C), random numbers are generated therewith by setting a random number key ks, thereby allowing the same given PN sequence to be generated without the need to retain an entire large PN sequence.

Figure 3:
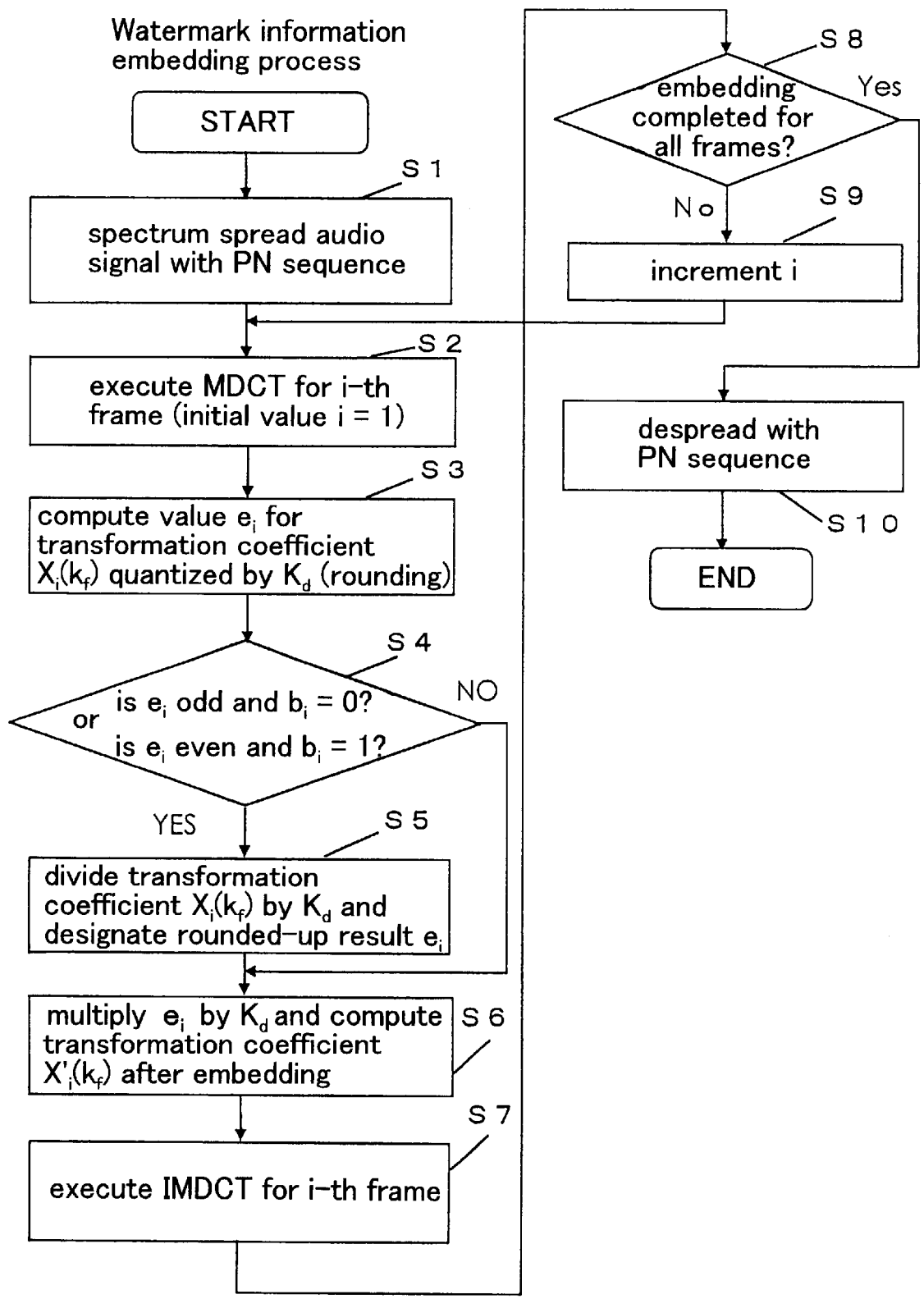
FIG. 3 is a flow chart showing the Steps in the watermark information embedding process.

FIG. 3 is a flow chart showing the Steps in the watermark information embedding process. In Step S1, the first multiplier 54 multiplies a source audio signal s(t) by a PN sequence g(t) to generate a first spread audio signal x(t). This operation is given by Equation 1.

$$x(t)=s(t) \cdot g(t) \quad (1)$$

Figure 4:
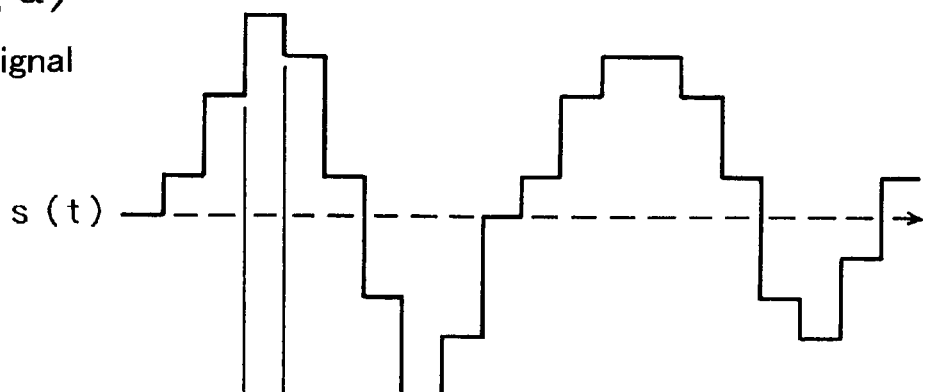
FIGS. 4(a)–4(d) are illustrative diagrams showing the basic principle of spectrum-spreading.
Figure 4:
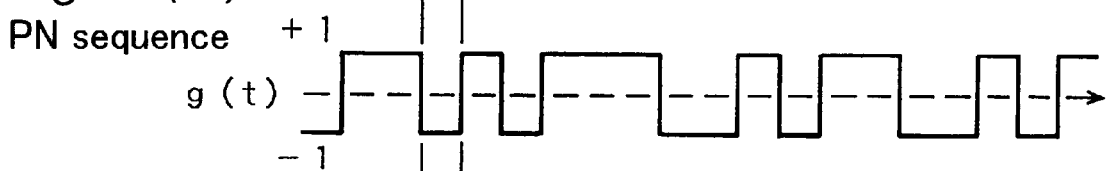
Figure 4:
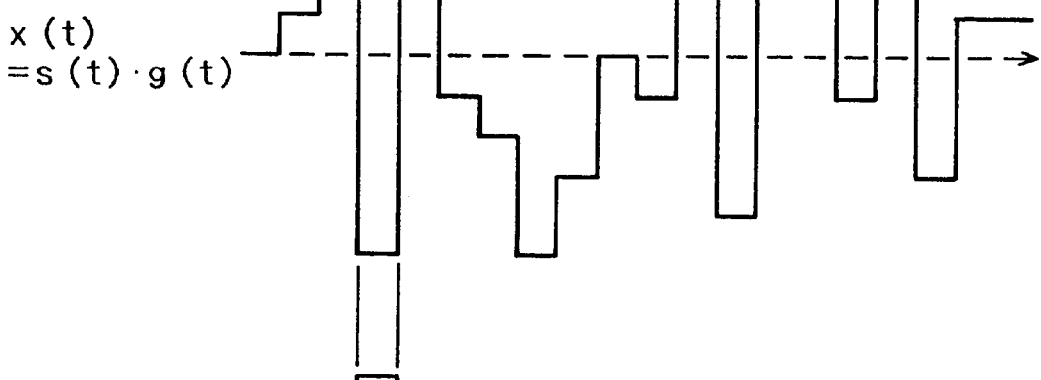
Figure 4:
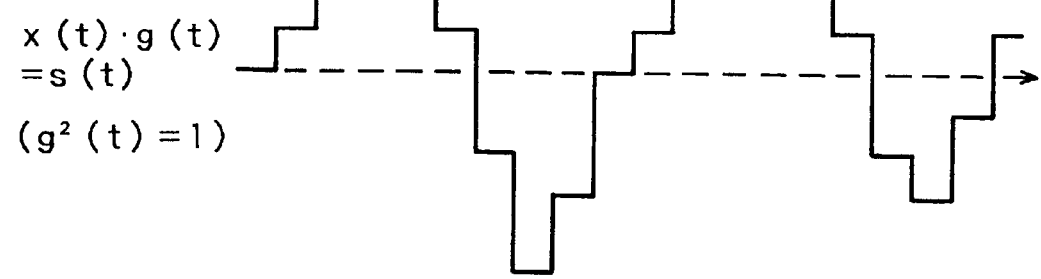

The operation represented by Equation 1 is equivalent to a process typically referred to as direct spectrum-spreading. FIGS. 4(a)–4(d) are illustrative diagrams showing the basic principle of spectrum-spreading. FIG. 4(a) shows a source audio signal s(t), FIG. 4(b) shows a PN sequence g(t), and FIG. 4(c) shows a first spread audio signal x(t). Source audio signal s(t) is a digital audio signal produced, for example by digitizing an analog audio signal at a 44.1 kHz sampling rate and quantization on 16 bits. The PN sequence g(t) used in the present embodiment (FIG. 4(b)) is a signal that varies at a frequency equal to the sampling frequency for source audio signal s(t). Accordingly, the first spread audio signal x(t) produced by multiplying these signals s(t) and g(t) (FIG. 4(c)) has the same frequency as the source audio signal s(t), with the sign of some of the signal values being the opposite of that in the source audio signal s(t). As shown in FIG. 4(d), again multiplying a given PN sequence g(t) by the first spread audio signal x(t) reproduces the source audio signal s(t). The reason is that since a PN sequence g(t) is a binary signal of +1's and −1's, the square $g^2(t)$ of a given PN sequence g(t) will be equal to 1. The process of again multiplying a PN sequence g(t) is termed "despreading."

Spectrum-spreading is mainly used in the communications field. In the communications field, however, a digitally modulated signal is used as the source signal s(t). Also, a sequence of a frequency several tens of times higher than the frequency of the source signal s(t) is used as the PN sequence g(t), so the spectrum distribution of the spread signal x(t) is spread several tens of times wider than the source signal s(t). The receiver receives the spread signal x(t) and multiplies the received spread signal x(t) by the same given PN sequence g(t) to reconstitute the source signal s(t), as shown in FIG. 4(d). The spectrum distribution of noise and interference introduced on the communication path is spread by a multiple of several tens during the despreading process, so spread spectrum communication enhances the ability to eliminate noise and interference.

In the present embodiment a PN sequence g(t) varies at the same frequency as the sampling frequency of the source audio signal s(t), and thus strictly speaking the spectrum distribution is not spread. However, as used herein the term "spectrum-spreading" is used in a wider meaning than is customary, and "spectrum-spreading" shall be used to refer also to cases where a PN sequence g(t) varies at the same frequency as the sampling frequency of the source audio signal s(t). In the processes according to the present invention, the frequency of a PN sequence g(t) may be set to some integral multiple of the sampling frequency of the source audio signal s(t).

The spectrum-spreading and despreading illustrated in FIGS. 4(a)–(d) can be thought of as encoding and decoding a source audio signal s(t) using a PN sequence g(t) as a key. Accordingly, the security of watermark information embedded in an audio signal can be enhanced through spectrum-spreading. This aspect will be discussed later.

In Step S2 in FIG. 3, frame extractor 56 extracts the i-th frame (initial value i=1) from the first spread audio signal x(t), and the MDCT processor 58 performs a modified discrete cosine transformation (MDCT) on the frame. Here, "frame" refers to a signal segment that is the subject of a modified discrete cosine transformation; in the present embodiment, one frame contains 2M (M is an integer equal to 2 or greater) signal values. The MDCT coefficient Xi(k) for the i-th frame is given by the following Equation 2.

$$X_i(k) = \frac{2}{M} \sum_{n=0}^{2M-1} w(n)c(k, n) \times (n + iM) \quad (2)$$

$$0 \leq k \leq M - 1, 0 \leq n \leq 2M - 1$$

Here, k is an integer representing the frequency. The window function w(n) and the MDCT basis c(k, n) in the right hand term in Equation 2 are given by Equations 3 and 4, respectively.

$$w(n) = \sin\left(\frac{\pi(2n+1)}{4M}\right), \quad 0 \le n \le 2M-1 \tag{3}$$

$$c(k,n) = \cos\left(\frac{\pi(2k+1)(2n+M+1)}{4M}\right) \tag{4}$$
$$0 \le k \le M-1, 0 \le n \le 2M-1$$

As will be apparent from Equation 2, the 2M signal values x(n+iM) in each frame are transformed into M transformation coefficients Xi(k) (k=0~(M−1)). The transformation coefficient Xi(0) (k=0) is termed the direct current component and the other transformation coefficients Xi(k) (k≠0) are termed the alternating current component.

Figure 5:
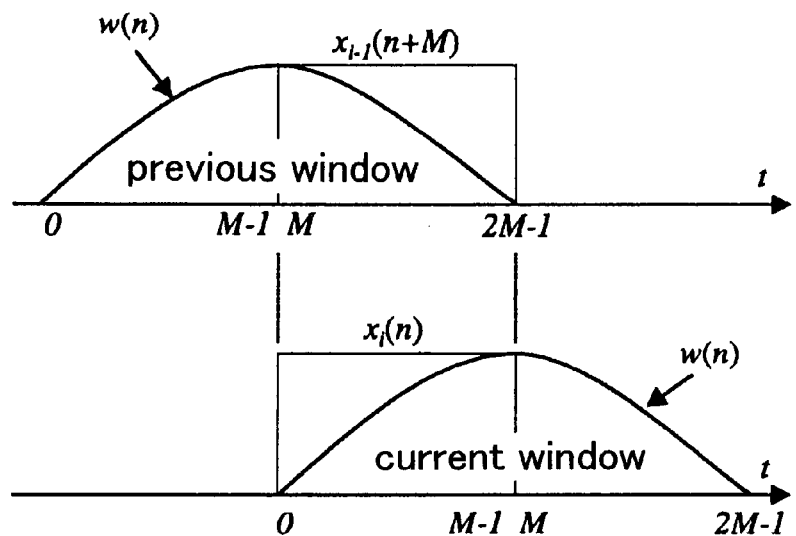
FIG. 5 is an illustrative diagram showing the frame and window function w(n) used in modified discrete cosine transformation.

FIG. 5 is an illustrative diagram showing the relationship of the frames and window function w(n) used in modified discrete cosine transformation. FIG. 5 shows the positional relationship of two proximate frames and the shape of the window function w(n) applied to each frame. In this way, each. frame is positioned serially shifted by an interval equivalent to M signal values x(t), so the two adjacent frames contain shared M signal values x(t). Thus, the effective (actual) number of signal values contained in a single frame is M.

The window function w(n) is a sine function having its peak in the center of each frame. A function other than a sine function could be used as window function w(n); typically, any function allowing for reversible modified discrete cosine transformation and inverse transformation thereof may be used.

Various other orthogonal transforms (e.g., discrete cosine transforms (DCT), discrete Fourier transforms (DFT), Hadamard transforms, etc.) can be used in place of modified discrete cosine transforms. In other orthogonal transformations, frames (also termed 'blocks") are positioned overlapping each other. In modified discrete cosine transformation, on the other hand, frames are positioned such that adjacent frames partially overlap, allowing for higher frequency separation and reduced frame distortion (block distortion). The use of modified discrete cosine transformation thus affords less degradation of sound quality with embedding of watermark information than do other orthogonal transforms.

In Steps S3 to S6 in FIG. 3, watermark information is embedded in a specific frequency component of the transformation coefficient by the embedding processor 60. The watermark information consists of a plurality of bits; hereinbelow, each bit of watermark information shall be referred to as a "watermark bit bi." A frequency keys kf and a scale key kd are used during embedding of watermark bits bi. Frequency key kf is an integer representing the frequency of a specific frequency component Xi(kf) in which watermark bits bi are embedded in the MDCT coefficients Xi(k) (k=0~(M−1)) for a single frame. Preferred integers for use as frequency key kf are preselected from the range 0 to M. Scale key kd is a positive integer indicating a step size for quantization of MDCT coefficients Xi(kf) and is arbitrarily chosen from non-zero positive integers. Preferred values for frequency keys kf and scale keys kd are discussed later.

In Step S3, frequency coefficients Xi(kf) indicated by frequency key kf are divided by scale key kd and rounded to the decimal point to give integers ei (termed "quantized values").

$$e_i \leftarrow \lfloor X_i(k_f)/k_d \rfloor \tag{5}$$

In Step S4, a determination is made as to whether quantized values ei and embedded bits bi meet either of the following conditions.

Condition 1: ei is odd and bi=0.
Condition 2: ei is even and bi=1.

Where either of Conditions 1 and 2 is met, MDCT coefficients Xi(k) are divided by scale key kd and rounded to the decimal point to give quantized values ei, as indicated in Equation 6 (Step S5).

$$e_i \leftarrow \lfloor X_i(k_f)/k_d \rfloor \tag{6}$$

Where, on the other hand, neither of Conditions 1 and 2 is met, the quantized value ei obtained in Step S3 is used as–is. As a result, if a watermark bit bi is "0," the quantized value ei is even (the least significant bit is "0") whereas if a watermark bit bi is "1," the quantized value ei is odd (the least significant bit is "1"). That is, in the process of Steps S3 to S5, quantized values ei of the MDCT coefficients Xi(kf) are modulated to quantized values ei associated with the watermark bits bi, so that watermark bits bi are embedded within the quantized values ei.

Where the values Xi(kf)/kd obtained by dividing MDCT coefficients Xi(kf) by a scale key kd are integers that do not contain a decimal part, the quantized values ei will be the same as in Step S3 despite rounding up in Step S5. Accordingly, it is possible to use an operation such as adding "1" to or subtracting "1" from the quantized values ei obtained in Step S3, instead of rounding up.

Figure 6:
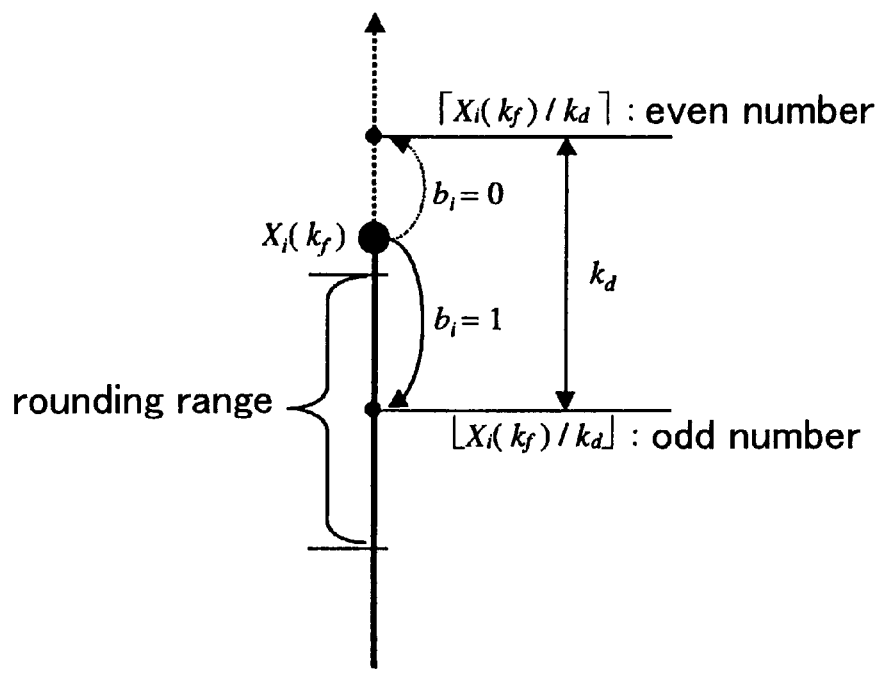
FIG. 6 is an illustrative diagram showing the process of Steps S3 to S5.

FIG. 6 is an illustrative diagram showing the process of Steps S3 to S5. As shown on the right side in FIG. 6, quantized values ei for MDCT coefficients Xi(kf) over the range for scale key kd are produced by rounding up where a watermark bit bi is "0," and by rounding off where a watermark bit bi is "1." For purposes of comparison, the "rounding range" to the left side in FIG. 6 shows the range over which rounded quantized values ei are odd.

In Step S6 in FIG. 3, quantized values ei in which watermark bits bi have been embedded are multiplied by a scale key kd to generate MDCT coefficients X'i(kf) in which watermark bits bi have been embedded, as indicated in Equation 7.

$$X'_i(k_f) \leftarrow e_i \cdot k_d \tag{7}$$

The process of Step S3 functions as a quantizing section for quantizing a specific frequency component Xi(kf) of transformation coefficients with a scale key kd. The process of Steps S4 and S5 functions as a bit modulator for modulating the least significant bit of a quantized value ei to associate it with a watermark bit bi. The process of Step S6 functions as an inverse quantizing section for inverse quantization by multiplying quantized values ei containing embedded watermark bits by a scale key kd.

In Step S7, the MDCT coefficients X'i(kf) (k=0~(M−1)) of a single frame including a frequency component X'i(kf) that contains embedded watermark bits bi is subjected to an inverse modified discrete cosine transformation by IMDCT processor 62 (FIG. 2). MDCT coefficients X'i(k) (≠kf) other than the frequency component X'i(kf) containing embedded watermark bits bi are the same as the MDCT coefficients Xi(k) obtained in Step S2. The inverse modified discrete cosine transformation is represented by Equation 8, below.

$$x'_i(n) = w(n) \sum_{k=0}^{M-1} c(k,n) X'_i(k) \tag{8}$$
$$0 \le k \le M-1, 0 \le n \le 2M-1$$

The window function w(n) and base c(k, n) used for the inverse transformation are the same as in direct transformation.

In Step S7, the frame regenerator 64 generates a second spread audio signal x'(t) as a time series signal, using the following Equation 9.

$$x'(t)=x'(n+M)=x'_{i-1}(n+M)+x'_i(n) \quad (9)$$

$$0 \leq n \leq M-1$$

Here, x'i−1(n+M) is the inverse transformed signal of the (i−1)th frame and x'i(n) is the inverse transformed signal of the i-th frame; signals x'i−1(n+M) and x'i(n) have an overlapping interval (FIG. 5).

In Step S8, a determination is made as to whether embedding of watermark information has been completed for all frames, and if not completed, in Step S9, i is incremented and the process returns to Step S2. If, on the other hand, embedding of watermark information has been completed for all frames, the process proceeds from Step S8 to Step. S10, wherein a second multiplier 66 multiplies second spread audio signal x'(t) by, a PN sequence g(t) to perform spectrum-despreading. This process gives an audio signal s'(t) containing embedded watermark information. Hereinbelow, this audio signal s'(t) shall be referred as a "digitally watermarked audio signal."

In the present embodiment, a single frame of audio signal s'(t) contains 1 bit of embedded watermark information, each single frame being composed substantially of M signal values. The watermark embedding rate Br is given by equation 10.

$$B_r = \frac{f_s}{M} \text{ [bit/s]} \quad (10)$$

where fs is the sampling frequency of the source audio signal s(t).

Where watermark information is composed of N bits, a single item of watermark information is embedded in N frames of the audio signal. Accordingly, the N bits of watermark information are embedded in repeating fashion every N frames.

Digitally watermarked audio signals s'(t) obtained in this way may be distributed in various forms. For example, digitally watermarked audio signals s'(t) may be transmitted over a communications line. They may also be distributed on exclusive music storage media such as CD-ROM and DVD, or on computer-readable storage media. Digitally watermarked audio signals s'(t) may be modulated or compressed. Where a digitally watermarked audio signal s'(t) is stored on a computer-readable storage medium, the digitally watermarked audio signal s'(t) can be read from the storage medium and the watermark information extracted.

As noted, watermark information is embedded in MDCT coefficients and then undergoes inverse orthogonal transformation, resulting in a much lower level of sound degradation by watermark information than with the prior art. The relationship between embedding of watermark information and sound degradation is discussed later.

C. Watermark Information Extraction Process

Figure 7:
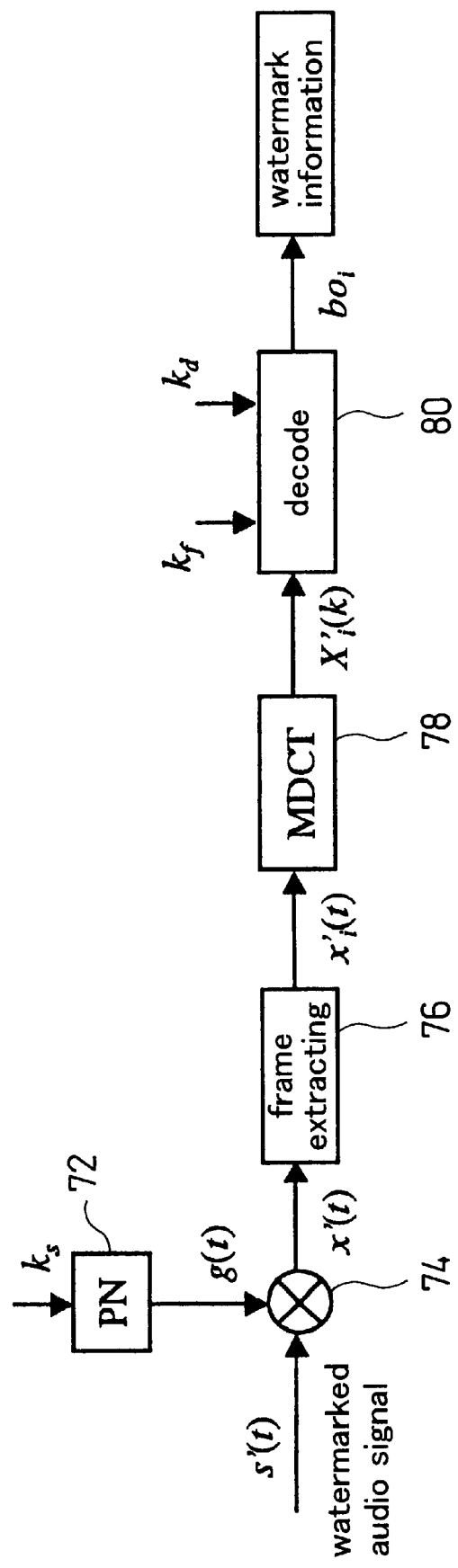
FIG. 7 is a block diagram showing the function of a digital watermark extracting section 44.

FIG. 7 is a block diagram showing the function of a digital watermark extracting section 44 (FIG. 1). Digital watermark extracting section 44 comprises a PN sequence generator 72, a multiplier 74, a frame extractor 76, an MDCT processor 78, and a decoder 80. PN sequence generator 72 is identical to PN sequence generators 52, 68 shown in FIG. 2, and generates a specific PN sequence g(t) according to a PN sequence generation key ks. Multiplier 74, frame extractor 76, and MDCT processor 78 are identical in form and function to multiplier 54, frame extractor 56, and MDCT processor 58 shown in FIG. 2.

Figure 8:
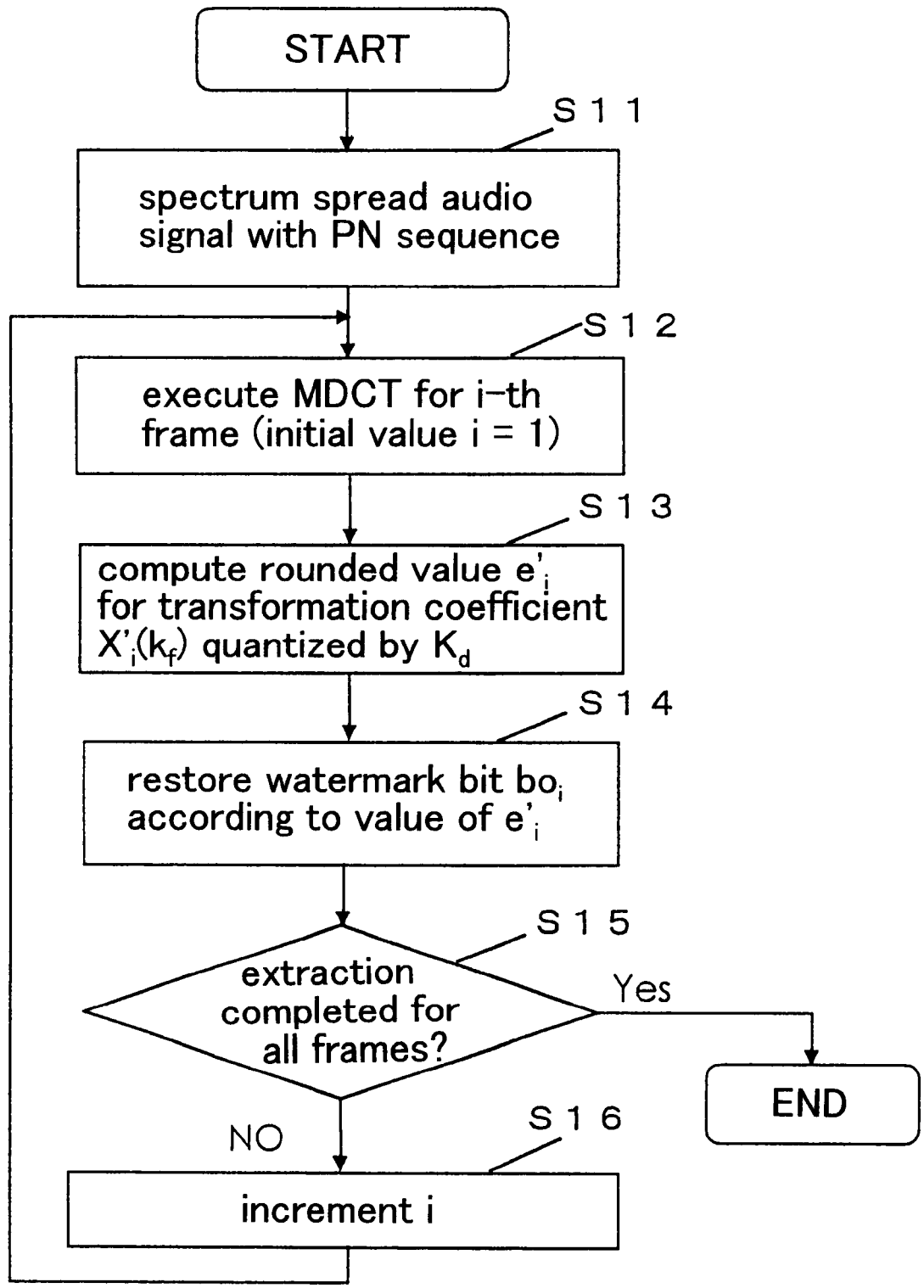
FIG. 8 is a flow chart showing the Steps in the watermark information extraction process.

FIG. 8 is a flow chart showing the Steps in the watermark information extraction process. In Step S11, multiplier 74 performs spectrum-spreading of a digitally watermarked audio signal s'(t) with the same PN sequence g(t) used for embedding, to generate a spread audio signal x'(t). This process is represented by Equation (11).

$$s'(t) \cdot g(t) = x'(t) \cdot g^2(t) \quad (11)$$

$$= x'(t)$$

Here, a PN sequence g(t) is used due to the fact that $g^2(t)=1$ (see FIG. 4(d)).

In Step S12, frame extractor 76 extracts the i-th frame (initial value i=1) from the spread audio signal x'(t), and the MDCT processor 78 performs modified discrete cosine transformation on the frame. In Step S13, the decoder 80 extracts the frequency component X'i(kf) specified by the frequency key kf used during embedding, and computes quantized values e'i by quantization of frequency component X'i(kf) by a scale key kd, following Equation 12.

$$e'_i \leftarrow \text{Round}(X'_i(k_f)/k_d) \quad (12)$$

where the operator Round ( ) indicates an operation that gives integers through rounding.

Since modified discrete cosine transformation is a reversible transformation, the value X'i(kf)/kd in parentheses in the right side of Equation 12 is typically an integer and as such does not require rounding. However, if bit errors should occur for some reason, such as improper waveform processing by a third party, the value X'i(kf)/kd resulting from division by scale key kd will not be the correct integer. By rounding the value X'i(kf)/kd in the manner indicated by Equation 10, it is possible to correct watermark information extraction error due to modification of a digitally watermarked audio signal s'(t). That is, robustness to watermark information errors is improved through rounding. This robustness to errors is greater the larger the scale key kd. For example, setting scale key kd to a large value allows watermark information to be extracted correctly even if a digitally watermarked audio signal s'(t) has undergone appreciable modification. On the other hand, larger scale keys kd are associated with increased sound degradation, discussed later. That is, while smaller scale keys kd pose increased risk that watermark information may be obliterated through modification of a digitally watermarked audio signal s'(t), sound degradation is lower.

In Step S14 in FIG. 8, decoder 80 restores watermark bits boi corresponding to quantized values e'i. Specifically, where a quantized value e'i is even, a decision is made that watermark bit boi is "0," and where odd, a decision is made that watermark bit boi is "1." In Step S15, a determination is made as to whether extraction of watermark information has been completed for all frames, and if not completed, in Step S16, parameter i is incremented and the process returns to Step S12. If, on the other hand, extraction of watermark information has been completed for all frames, the process terminates. Watermark information composed of a plurality of bits is thus extracted. The process of FIG. 8 may be terminated as soon as correct watermark information composed of a plurality of bits has been extracted once.

If the PN sequence used for the watermark extraction process differs from the PN sequence used for the embedding process, the signal output by multiplier 74 of digital watermark extracting section 44 will differ from the spread audio signal x'(t) containing embedded watermark information produced in embedding section 42. Accordingly, it will not be possible to correctly restore watermark information in such cases. That is, the present embodiment affords enhanced watermark information security through the use of spectrum-spreading. In particular, according to the present embodiment, embedding is performed on specific frequency transformation coefficients in order to minimize the effects of embedding watermark information on sound quality, so extraction of watermark information by an unauthorized third party would be a relatively simple matter unless spectrum-spreading were used. On the other hand, spectrum-spreading using a PN sequence has the advantage of being able to use the PN sequence as a kind of encoding/decoding key, affording enhanced security of watermark information embedded in one-dimensional data such as audio data.

D. Embedding Frequency Optimization

The effects of embedding watermark information on sound quality will now be examined. Quantization error $\delta i(k)$ produced by embedding watermark information in MDCT coefficients is defined by the following Equation 13.

$$\delta_i(k) = X'_i(k) - X_i(k) \tag{13}$$

where, Xi(k) indicates a coefficient prior to embedding and X'i(k) indicates a coefficient after embedding. In the embodiment described above, embedding is performed on a frequency component specified by a frequency key kf, so quantization error $\delta i(k)$ for frequency components other than k=kf is zero, as indicated by the following Equation 14.

$$\delta_i(k) = \begin{cases} \delta_i(k_f) & k = k_f \\ 0 & k \neq k_f \end{cases} \tag{14}$$

It should be noted that values of quantization error $\delta i(k)$ are not dependent on values of frequency key kf; and that the absolute values thereof $|\delta i(kf)|$ are equal to or less than the scale key kd.

The embedding effect Di(n) produced by in each frame of audio signal xi(n) is given by the following Equation 15, from Equation 8 (inverse transformation equation) and Equation 14, above.

$$D_i(n) = w(n)c(k_f, n)\delta_i(k_f)$$

$$0 \leq n \leq 2M-1 \tag{15}$$

The effect on an audio signal of embedding watermark information (i.e., noise) D(n) is given by the following Equation 16.

$$D(n) = D_{i-1}(n+M) + D_i(n)$$

$$0 \leq n \leq M-1 \tag{16}$$

Errors produced in digital audio signal values are given as rounded values of D(n), as indicated in the following Equation 17.

$$\hat{D}(n) = \text{Round}(D(n))$$

$$0 \leq n \leq M-1 \tag{17}$$

Figure 9:
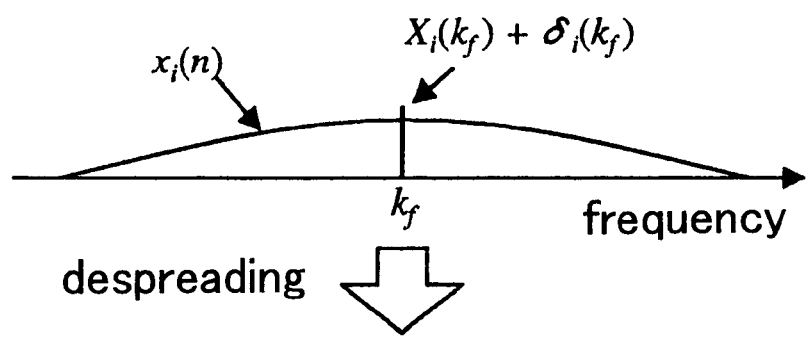
FIGS. 9(a) and 9(b) are illustrative diagrams showing the effects of noise produced by watermark information.
Figure 9:
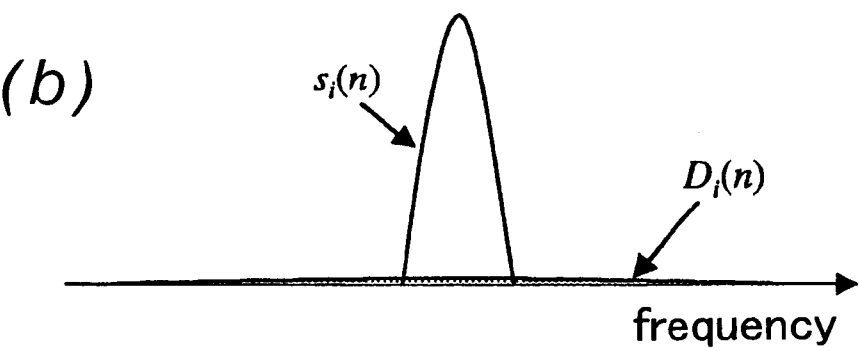

Referring to FIG. 9, embedding of watermark information in a specific frequency component Xi(kf) of MDCT coefficients is equivalent to imparting narrow-band noise interference $\delta i(kf)$. Accordingly, the bandwidth of the noise produced by embedding watermark information will be expanded M-fold (where M is the substantial number of signal values contained in a single frame) during audio restoration. It is thought the watermark information noise power becomes low as a result.

The signal to quantization noise ratio SNR is a basic parameter commonly used as an objective index of sound quality. The SNR [dB] evaluation equation is defined by the following Equation 18, using input audio signal So(m) and the quantization error thereof Er(m).

$$SNR = 10\log_{10}\left\{\sum_m So^2(m) / \sum_m Er^2(m)\right\} \tag{18}$$

In the present embodiment, SNRseg (segmental SNR) wherein SNR has been modified to improve the relationship with subjective evaluation. SNRseg is given by the following Equation 19.

$$SNR_{seg} = \frac{1}{N_f}\sum_{f=1}^{N_f} SNR_f \text{ [dB]} \tag{19}$$

where Nf denotes the number of frames during the measuring interval and SNRf is the SNR for the f-th frame. In the measurement example given below, single frame length is 32 ms. Error-free audio frames, (i.e., audio frames for which SNRf=∞) are excluded from measurement.

Figure 10:
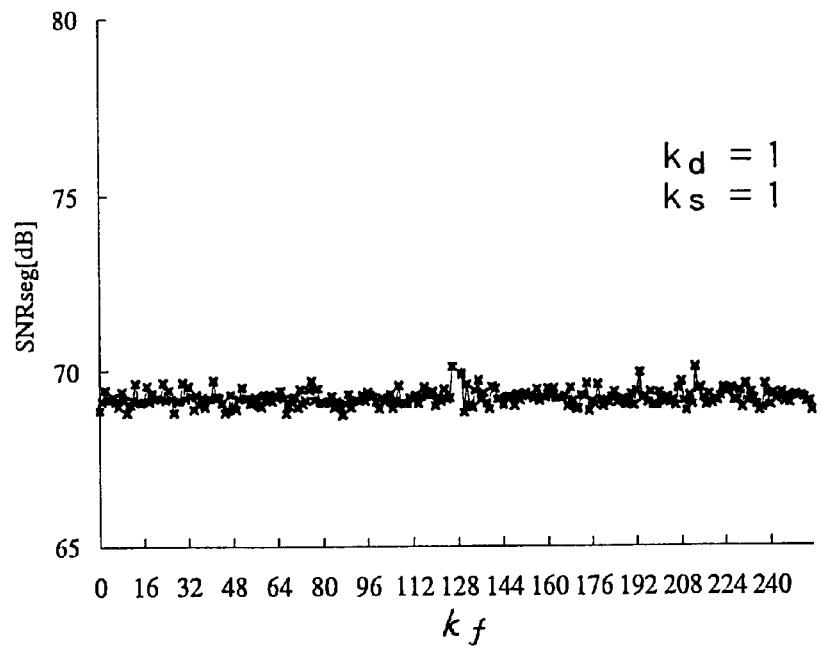
FIG. 10 is a graph showing the relationship between the frequency key kf value and the signal to quantization noise ratio SNRseg.

FIG. 10 is a graph showing the relationship between the value of frequency key kf and the signal to quantization noise ratio SNRseg. Here, the substantial number M of signal values contained in a single frame (i.e., the number of transformation coefficients per single frame) is 256. There is one scale key kd and one PN sequence generating key ks (FIG. 2). From the results in FIG. 10, it will be apparent that when kf=127 or 128, waveform distortion is appreciably less than in other cases. It is thought that the reason is that, as indicated in the preceding Equations 15 and 17, the effect on the noise component Di(n) of different frequency keys kf is due to the MDCT basis c(k, n) and the digitization rounding process. Thus, when the substantial number M of signal values included in a single frame is 256, where the frequency key kf value is 127 or 128, sound quality degradation can be held to a minimum. Typically, the frequency key kf value will be equal to about one-half the substantial number M of audio signal values contained in a single frame.

It is also possible to embed a plurality of watermark bits within a single frame. For example, watermark bits could be embedded in two frequency components for which kf=127 or 128. As used herein, "embedding within a specific frequency component" includes also embedding a plurality of watermark bits within a single frame, as described here. However, a greater number of watermark information bits embedded per single frame is associated with a tendency for sound quality to degrade.

E. Test Results

When embedding watermark information into music software, for which value is placed on high sound quality, it is important to avoid degradation of sound quality with embedding. Embedding of watermark information into actual high quality sound data was performed and the effects on sound quality were determined. In this test, three types of music (classical, jazz, and dance) in the form of source audio signals s(t) digitized on 16 bits at a 44.1 kHz sampling rate were used. While music software is typically stereo, embedding was performed on one channel only.

In this test, since M=256, the watermark information embedding amount Br is about 172 bits/sec, given by preceding Equation 10. Comparative tests were conducted on the sound quality of these reproduced audio signals subjected to embedding and of reproduced audio signals not subjected to embedding.

Figure 11:
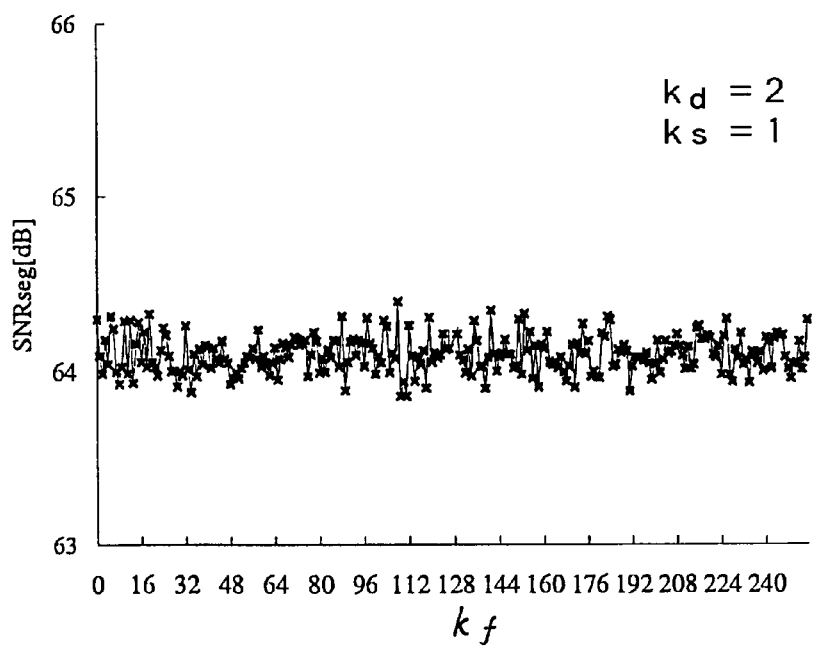
FIG. 11 is a graph showing the relationship between the frequency key kf value and the signal to quantization noise ratio SNRseg.
Figure 12:
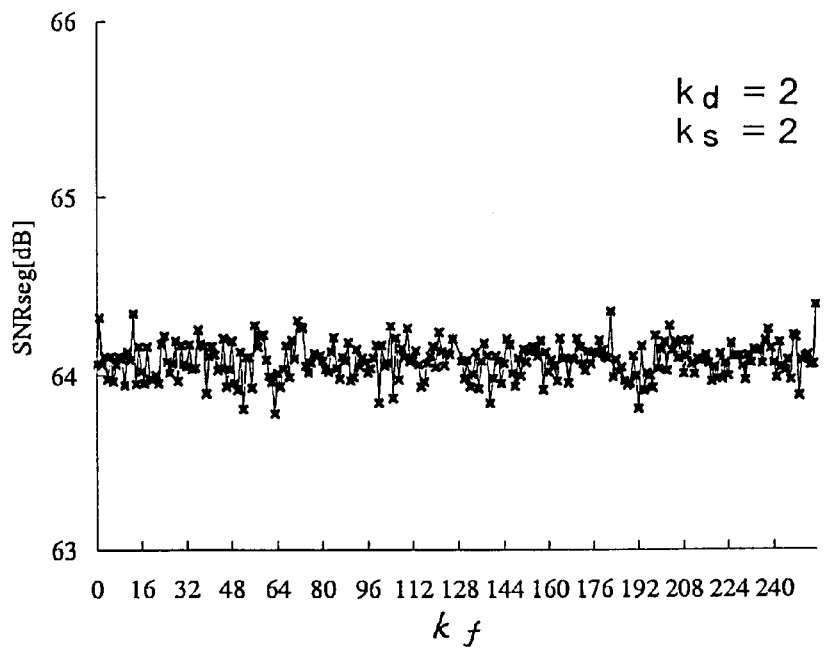
FIG. 12 is a graph showing the relationship between the frequency key kf value and the signal to quantization noise ratio SNRseg.

FIG. 11 is a graph of SNRseg for classical music containing an embedded watermark, holding scale key kd constant and varying frequency key kf. Here, kd=2 and ks=1 (ks is the PN sequence generating key). FIG. 11 also shows optimal sound quality where the value of frequency component key kf is around 128. FIG. 12 shows results when the value of the PN sequence generating key ks was set to 2 to generate a PN sequence of a different variation pattern than in FIG. 11, with the scale key kd set to the same value as in FIG. 11.

Figure 13:
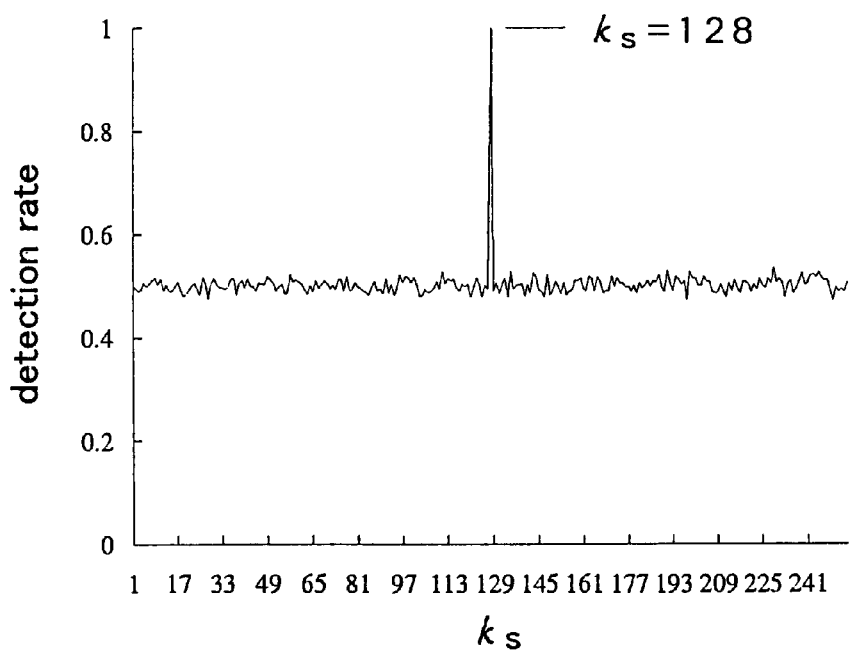
FIG. 13 is a graph showing the detection rate when it is attempted to detect watermark information using a PN sequence generating key ks different from that used during embedding.

FIG. 13 is a graph showing the detection rate when it is attempted to detect watermark information in a classical music audio signal containing embedded watermark information using a different PN sequence generating key. During embedding of watermark information the scaling key kd was 2, the frequency key kf was 128, and the PN sequence generating key was 128. From the results in FIG. 13 it will be apparent that when a PN sequence generated with the correct PN sequence generating key (=128) is decoded, the detection rate is 1 and the watermark information can be completely decoded, whereas the detection rate falls to 0.5 when the PN sequence generating key has a different value. Where the detection rate is 0.5, watermark information cannot be detected correctly since 0's and 1's appear randomly. Thus, according to the digital watermarking technique of the present embodiment, the PN sequence g(t) used for embedding functions as an encoding key, assuring a high degree of security for watermark information. Thus, in preferred practice the PN sequence g(t) will be one that does not readily generate a sequence with high correlation. In this sense, it is better not to use a readily available PN sequence generator (such as the standard function in C), but rather to use a PN sequence generator that is not readily available to the public.

Figure 14:
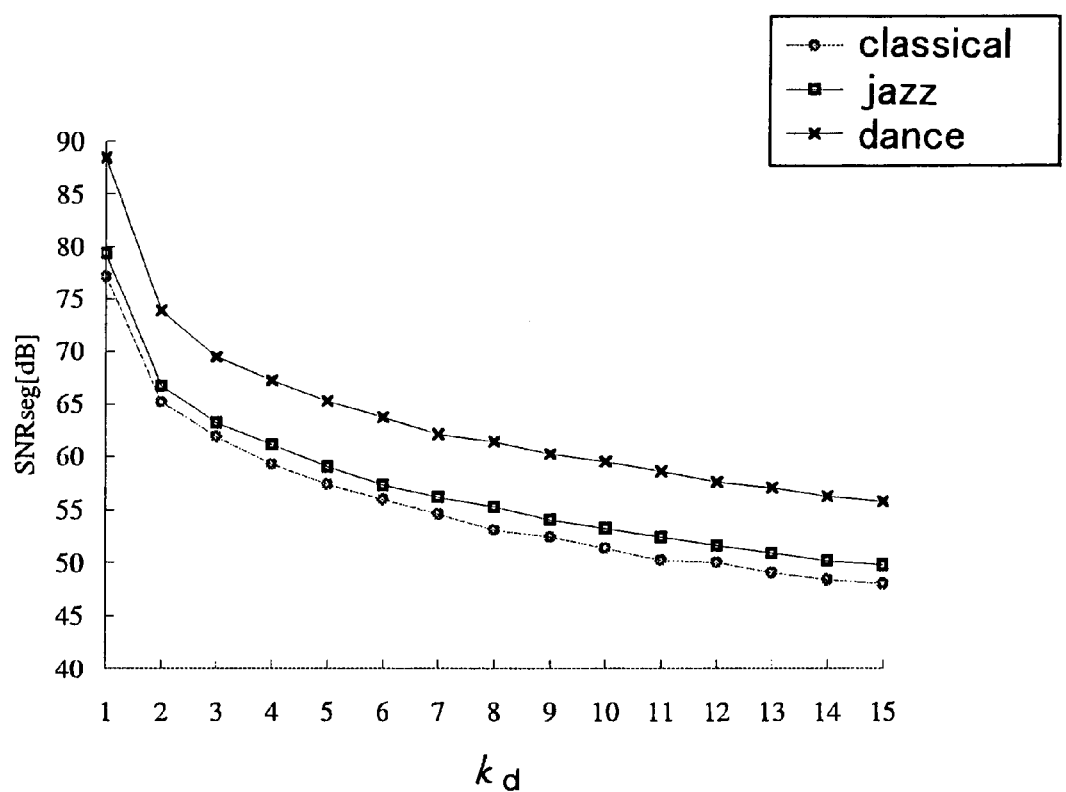
FIG. 14 is a graph showing changes in sound quality produced by varying the scale key kd.

FIG. 14 is a graph showing changes in sound. quality produced by varying the scale key kd with the frequency key kf at a constant value of 128. From FIG. 14 it will be apparent that SNRseg (which indicates the sound quality of the restored audio) drops with larger scale keys kd. A relatively small value of around 1 to 3 for scale key kd is preferred in order to maintain high quality. On the other hand, a larger value for scale key kd is desirable in terms of reliable detection of watermark information from a digitally watermarked audio signal. Where music data has been digitally copied without any loss in product value (namely, without excessive increasing in degradation of sound quality), it will be possible to extract the correct watermark information even where scale key kd is small. On the other hand, where it is desired to extract watermark information from a degraded sound quality (compression loss) audio signal, a larger scale key kd value is desirable.

FIGS. 15(a)–15(c) are graphs showing a reproduced audio waveform devoid of embedded watermark information, a reproduced audio waveform containing embedded watermark information, and the differential waveform thereof. These waveforms correspond to the piano in a jazz piece. From the differential waveform in FIG. 15(c) it will be apparent that there is virtually no difference between the waveforms. in FIGS. 15(a) and 15(b).

In this way, according to the present embodiment, highly secure watermark information can be embedded in music software without any loss in sound quality. In the preceding embodiment, watermark information is embedded in a specific frequency component of transformation coefficients obtained by MDCT transformation of a source audio signal, making it possible to embed and extract watermark information regardless of the sampling frequency of the source audio signal s(t). In other words, the digital watermarking technique of the present embodiment can be applied to high quality audio data as well as to low quality audio data.

The invention is not limited to the examples and embodiments disclosed herein and may take a number of different forms within the scope thereof, such as the following modifications, for example.

(1) Software may be used to perform some of the functions performed by hardware in the preceding embodiment; alternatively, hardware may be used to perform some of the functions performed by software. For example, the digital watermark embedding section 43 shown in FIG. 2 and the digital watermark extracting section 44 shown in FIG. 7 could be implemented through hardware circuits.

(2) In the preceding embodiment, a random sequence of two values (+1 and −1) was used as the PN sequence g(t), but it would be possible to use an integer p other than 1 as the absolute value for the PN sequence g(t). Typically, a positive/negative sequence that randomly assumes positive/negative values having a specific absolute value p can be used. In such cases, the output x'(t)·g(t) of the second multiplier 66 in FIG. 2 is divided by the square of integer p to produce the digitally watermarked audio signal s'(t).

(3) Various other operations equivalent to multiplying the PN sequence (positive/negative sequence) by the source audio signal can be used as the operation for spectrum-spreading. For example, spectrum-spreading is possible by logical operations using a binary sequence that randomly assumes 0 level and 1 level. In this case, a plurality of EXOR (exclusive-OR) circuits could be provided for input of each bit of the source audio signal, and the binary sequence is input commonly to this plurality of EXOR circuits to produce an operation equivalent to multiplying the PN sequence by the source audio signal. Specifically, when a binary sequence 0 level is input to the plurality of EXOR circuits, the source audio signal is output as–is, an operation equivalent to multiplying the source audio signal by +1. On the other hand, when a binary sequence 1 level is input to the plurality of EXOR circuits, the bits of the source audio signal are inverted, an operation equivalent to multiplying the source audio signal by −1. A spread audio signal subjected to spectrum-spreading in this way may be subjected to another process by the EXOR circuits using the same binary sequence to reproduce the source audio signal.

INDUSTRIAL APPLICABILITY

The present invention is applicable to apparatuses and methods for digital watermarking of various kinds of one-dimensional data, such as audio data, measurement data, and digital control feedback signals.

What is claimed is:

1. A method for embedding watermark information in one-dimensional source data, comprising the steps of:

(a) performing spectrum-spreading by an operation equivalent to multiplying the one-dimensional source data by a specific positive/negative value sequence that randomly assumes positive/negative values having a specific absolute value, thereby generating first spread one-dimensional data;

(b) subjecting the first spread one-dimensional data to orthogonal transformation;

(c) modulating a specific frequency component value of transform coefficients obtained through the orthogonal transformation to provide association with the watermark information;

(d) subjecting the modulated frequency component to inverse orthogonal transformation to generate second spread one-dimensional data; and (e) performing spectrum-despreading on the second spread one-dimensional data using the specific positive/negative value sequence to generate digitally watermarked one-dimensional data in which the watermark information has been embedded.

2. A method for embedding a digital watermark according to claim 1, wherein the steps (a) and (e) each include a step of generating the specific positive/negative value sequence according to a specific frequency generation key.

3. A method for embedding a digital watermark according to claim 1, wherein the orthogonal transformation is modified discrete cosine transformation wherein each frame composed of 2M data (M is an integer equal to 2 or greater) in the first spread one-dimensional data is subjected to transformation using a predetermined window function; and the first spread one-dimensional data is divided into a plurality of frames in the modified discrete cosine transformation such that adjacent frames take locations mutually shifted by intervals of M data.

4. A method for embedding a digital watermark according to claim 3, wherein the specific frequency component associated with the watermark information is a frequency component value substantially equivalent to M/2.

5. A method for embedding a digital watermark according to claim 1, wherein the step (c) includes:

(i) quantizing the specific frequency component by a predetermined integer kd to generate a first quantized value;

(ii) associating the least significant bit of the first quantized value with the watermark information bit value through modulation to generate a second quantized value; and (iii) multiplying the second quantized value by the predetermined integer kd to generate the modulated frequency component.

6. An apparatus for embedding a digital watermark in one-dimensional source data, comprising:

a spectrum-spreading section that performs spectrum-spreading by an operation equivalent to multiplying the one-dimensional source data by a specific positive/negative value sequence that randomly assumes positive/negative values having a specific absolute value, thereby generating first spread one-dimensional data;

an orthogonal transformation section that subjects the first spread one-dimensional data to orthogonal transformation;

an embedding section that modulates the specific frequency component value of transform coefficients obtained through the orthogonal transformation to provide association with the watermark information;

an inverse transformation section that subjects the modulated frequency component to inverse transformation to generate second spread one-dimensional data; and a despreading section that performs spectrum-despreading on the second spread one-dimensional data using the specific positive/negative sequence to generate digitally watermarked one-dimensional data in which the watermark information has been embedded.

7. The apparatus for embedding a digital watermark according to claim 6, wherein the spectrum-spreading section includes a positive/negative sequence generator for generating the specific positive/negative sequence according to a specific frequency generation key.

8. The apparatus for embedding a digital watermark according to claim 6, wherein the orthogonal transformation section performs modified discrete cosine transformation using a predetermined window function on each frame composed of 2M data (M is an integer equal to 2 or greater) in the first spread one-dimensional data; and the first spread one-dimensional data is divided into a plurality of frames in the modified discrete cosine transformation such that adjacent frames take locations mutually shifted by intervals of M data.

9. The apparatus for embedding a digital watermark according to claim 8, wherein the specific frequency component associated with the watermark information is a frequency component value substantially equivalent to M/2.

10. The apparatus for embedding digital watermark according to claim 6, wherein the embedding section comprises a quantizing section that quantizes the specific frequency component with a scale key kd to generate a first quantized value;

a bit modulating section that modulates the least significant bit of the first quantized value to provide association with a bit value of the watermark information to generate a second quantized value; and an inverse quantizing section that generates the modulated frequency component by multiplying the second quantized value by the predetermined integer kd.

11. A computer-readable storage medium for storing a computer program for embedding watermark information in one-dimensional source data, the computer-readable storage medium storing a computer program for causing a computer to execute:

a spectrum-spreading function for performing spectrum-spreading by an operation equivalent to multiplying the one-dimensional source data by a specific positive/negative value sequence that randomly assumes positive/negative values having a specific absolute value, thereby generating first spread one-dimensional data;

an orthogonal transformation function for subjecting the first spread one-dimensional data to orthogonal transformation;

an embedding function for modulating the specific frequency component value of transform coefficients obtained through the orthogonal transformation to provide association with the watermark information;

an inverse transformation function for subjecting the modulated frequency component to inverse orthogonal transformation to generate second spread one-dimensional data; and a despreading function for performing spectrum-despreading on the second spread one-dimensional data using the specific positive/negative sequence to generate digitally watermarked one-dimensional data in which the watermark information has been embedded.

12. A computer-readable storage medium storing digitally watermarked one-dimensional data containing embedded watermark information, the digitally watermarked one-dimensional data being generated by:

spectrum-spreading by an operation equivalent to multiplying the one-dimensional source data by a specific positive/negative value sequence that randomly assumes positive/negative values having a specific absolute value, thereby generating first spread one-dimensional data;

subjecting the first spread one-dimensional data to orthogonal transformation;

modulating the specific frequency component value of transform coefficients obtained through the orthogonal transformation to provide association with the watermark information;

subjecting the modulated frequency component to inverse transformation to generate second spread one-dimensional data; and spectrum-despreading the second spread one-dimensional data using the specific positive/negative sequence to generate digitally watermarked one-dimensional data in which the watermark information has been embedded.

13. A method for extracting watermark information from digitally watermarked one-dimensional data in which the watermark information has been embedded, comprising the steps of:

(a) performing spectrum-spreading by an operation equivalent to multiplying the digitally watermarked one-dimensional data by a specific positive/negative value sequence that randomly assumes positive/negative values having a specific absolute value, thereby generating first spread digitally watermarked one-dimensional data;

(b) subjecting the first spread digitally watermarked one-dimensional data to orthogonal transformation; and (c) extracting the watermark information associated with the specific frequency component value from the frequency component of the transformation coefficients obtained by the orthogonal transformation.

14. An apparatus for extracting watermark information from digitally watermarked one-dimensional data in which the watermark information has been embedded, comprising:

a spectrum-spreading section that performs spectrum-spreading by an operation equivalent to multiplying the digitally watermarked one-dimensional data by a specific positive/negative value sequence that randomly assumes positive/negative values having a specific absolute value, thereby generating first spread digitally watermarked one-dimensional data;

an orthogonal transformation section that subjects the first spread digitally watermarked one-dimensional data to orthogonal transformation; and a decoder that extracts the watermark information associated with the specific frequency component value from the frequency component of the transformation coefficients obtained by the orthogonal transformation.

15. A computer-readable storage medium for storing a computer program for extracting watermark information from digitally watermarked one-dimensional data in which the watermark information has been embedded, the computer-readable storage medium storing a computer program for causing a computer to execute:

a spectrum-spreading function for performing spectrum-spreading by an operation equivalent to multiplying the digitally watermarked one-dimensional data by a specific positive/negative value sequence that randomly assumes positive/negative values having a specific absolute value, thereby generating first spread digitally watermarked one-dimensional data;

an orthogonal transformation function for subjecting the first spread digitally watermarked one-dimensional data to orthogonal transformation; and a decoding function for extracting the watermark information associated with the specific frequency component value from the frequency component of the transformation coefficients obtained by the orthogonal transformation.

16. A computer-readable storage medium storing digitally watermarked one-dimensional data containing embedded watermark information, the watermark information being able to be extracted by:

performing spectrum-spreading by an operation equivalent to multiplying the digitally watermarked one-dimensional data by a specific positive/negative value sequence that randomly assumes positive/negative values having a specific absolute value, thereby generating first spread digitally watermarked one-dimensional data;

subjecting the first spread digitally watermarked one-dimensional data to orthogonal transformation; and extracting the watermark information associated with the specific frequency component value from the frequency component of the transformation coefficients obtained by the orthogonal transformation.

* * * * *